United States Patent [19]
Carossino

[11] 3,787,972
[45] Jan. 29, 1974

[54] DEBURRING TOOL

[75] Inventor: Andre Carossino, Louveciennes, France

[73] Assignee: NEUMD Armaturenfabrik Apparatebau-Metallgiesserei GmbH, Knittlingen/Wurtt, Germany

[22] Filed: June 28, 1971

[21] Appl. No.: 157,092

[30] Foreign Application Priority Data
June 30, 1970 Israel.................................. 34821

[52] U.S. Cl.......................... 30/317, 30/169, 306/6, 287/DIG. 5, 29/90
[51] Int. Cl............................................. B23d 79/08
[58] Field of Search..... 30/169, 171, 314, 317, 321; 306/6; 287/58 CT, DIG. 5; 15/145, 236; 29/90

[56] References Cited
UNITED STATES PATENTS

| | | | |
|---|---|---|---|
| 1,365,851 | 1/1921 | Reynolds | 30/169 X |
| 2,461,108 | 2/1949 | Coffing | 306/6 |
| 2,598,443 | 5/1952 | Roth | 30/169 X |
| 2,759,263 | 8/1956 | Shigley et al. | 30/169 X |
| 2,893,765 | 7/1959 | Lyon | 287/58 CT |
| 2,963,930 | 12/1960 | Clothier et al. | 287/58 CT |
| 2,865,100 | 12/1958 | Gilbert | 30/317 |

Primary Examiner—Othell M. Simpson
Attorney, Agent, or Firm—Brumbaugh, Graves, Donohue & Raymond

[57] ABSTRACT

The invention relates to a manual deburring tool having a handle, a scraper blade and a blade-holder attached to the handle, and having a longitudinal bore into which a circular shank of the blade is rotatably inserted. To enable the tool to be used for working on internal edges as well as external edges, the blade-holder has a transverse bore which intersects the longitudinal bore and into which the shank of the blade is alternatively rotatably insertable. A releasable locking device is provided in the region of the intersection of the bores for holding the blade in the selected bore. The releasable locking device is in the form of a spring biased sleeve which normally holds a spherical detent member in engagement with a peripheral groove on the blade shank whether the blade shank is inserted in the longitudinal bore or the transverse bore. The blade-holder is itself releasably located in an adjusted position in the handle.

9 Claims, 5 Drawing Figures

INVENTOR
ANDRÉ CAROSSINO

PATENTED JAN 29 1974

INVENTOR
ANDRÉ CAROSSINO

BY Brumbaugh, Graves, Donohue & Raymond
his ATTORNEYS.

DEBURRING TOOL

The invention relates to a manual deburring tool.

A known deburring tool has a scraper blade in a handle, with the scraper blade extending in the axial direction of the handle. Such a deburring tool can be used only for deburring outer edges of workpieces. It can be used only with difficulty for inner edges, such as bores in tubes, for valves, valve seats or the like, since the scraper blade cannot be brought into the correct working position for the purpose or can be brought into the correct working position only with difficulty. With the known deburring tool, the difficulties are increased by virtue of the fact that it has only a specific working length.

A feature of the invention is to provide a deburring tool of the kind having a handle, a scraper blade and a blade-holder having a longitudinal bore into which a circular shank of the blade is insertable and in which the shank is rotatable, which tool can be used for working on internal edges as well as on external edges.

In accordance with the invention, the blade-holder has a transverse bore which intersects the longitudinal bore and into which the shank of the blade is alternatively insertable and in which the shank is rotatable, and there is provided in the region of the bores an actuable locking device for holding the blade in the respective bore.

Thus, in the deburring tool constructed in accordance with the invention, the scraper blade merely has to be changed over in order to bring it into the most advantageous working position at any given time. Outer edges, or edges accessible from the outside, may be deburred if the shank of the blade extends substantially in the direction of the handle. When using a novel, double-cranked blade, it is also possible to deburr edges which are accessible only from the opposite direction, for example the internal edges of bores which are accessible only through the bore itself. However, when the blade is inserted into the transverse bore, it is also possible to deburr edges which are accessible only from a direction which is transverse of the direction in which they extend. An advantageous telescopic construction of the blade-holder also renders it possible to finish edges which are located a considerable distance inwardly. Thus, a deburring tool is provided which is universally useable.

The invention is further described, by way of example, with reference to the accompanying drawings, in which.

Figure 1:
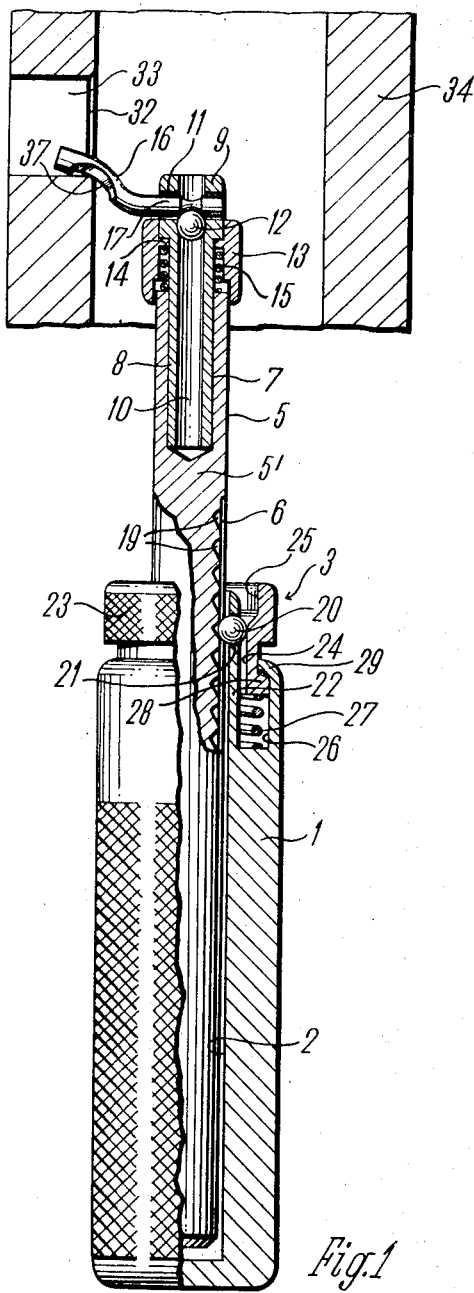
FIG. 1 is a fragmentary longitudinal section of a deburring tool, constructed in accordance with the invention, and of a workpiece to be finished.

The deburring tool illustrated in the drawings has a cylindrical handle 1 having an axial bore 2 and a fixing device 3 located on the upper portion of the handle.

A blade-holder 5 has a cylindrical rod 5' which can slide in the bore 2. The rod has a longitudinal groove 6 whose bottom incorporates substantially crescent-shaped notches 19. When the fixing device 3 has been loosened, the rod can be displaced between a retracted position and any one of a number of optional extended positions.

Figure 2:
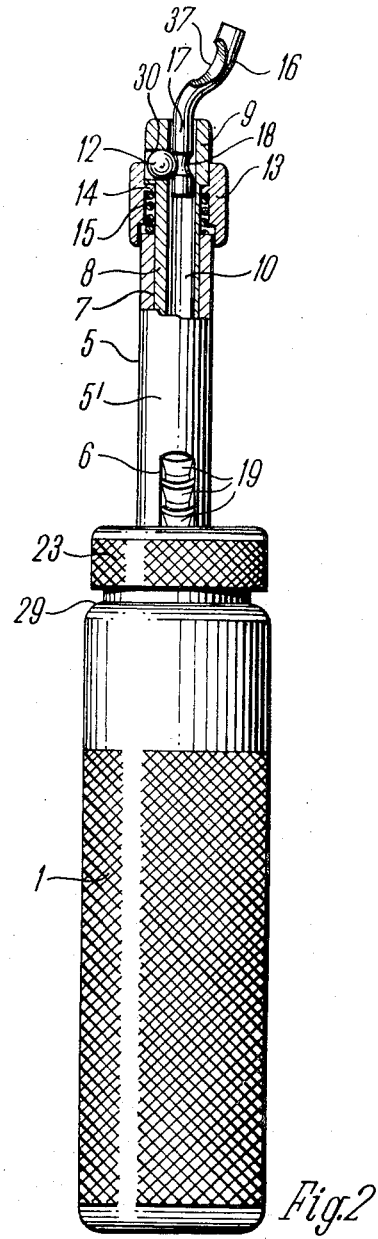
FIG. 2 is a fragmentary longitudinal section of the deburring tool, taken at rightangles to the section of FIG. 1, but with the blade differently inserted.

The fixing device 3 has a detent ball 20 provided in a bore 21 in a hollow shank 22 which surrounds the bore 2 in the handle. The hollow shank is surrounded by a locking sleeve 23 whose internal diameter is stepped to form a locking surface 24 of smaller diameter and a surface 25 of somewhat larger diameter. The sleeve 23 is longitudinally displaceable against the force of a compression spring 27 supported in a groove 26 in the handle. When in the unactuated state, the sleeve abuts by means of a collar 28 against a flange 29 formed on the handle. In this position, the ball is held in one of the notches 19 by the locking surface 24, thus fixing the rod 5' in a selected position. Referring to FIG. 1 or 2, the sleeve is displaced downwardly in order to displace the rod, so that the ball can yield outwardly up to the surface 25. The ball can then slide out of the notch, although it is held by the surface 25 in a position such that it is still located within the longitudinal groove 6 and prevents the rod 5' from turning.

Figure 3:
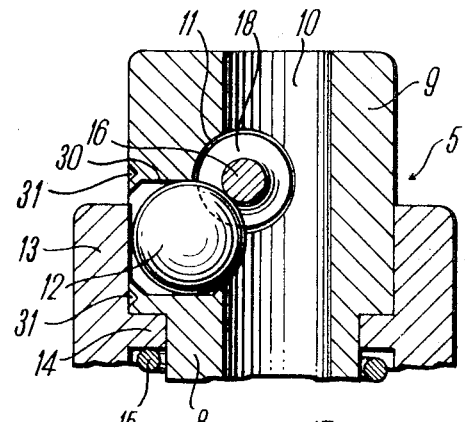
FIG. 3 is a detail section of part of FIG. 2, but showing the blade inserted as in FIG. 1 and to a larger scale.

The outer end of the blade-holder 5 has an axial recess or blind bore 7 which can accommodate a holder head 8. The holder head 8 is a rod having an enlarged end 9. The holder head 8 is pushed into the bore 7. A longitudinal bore 10 is provided in the holder head 8 somewhat eccentrically of the central longitudinal axis of the holder head. This facilitates the mounting of the locking device described hereinafter. A transverse bore 11, which intersects the longitudinal bore 10, extends through the holder head 8 and is also arranged somewhat eccentrically, i.e. spaced from the central longitudinal axis and the axis of the bore 10. A recess 30 in the holder head 8 accommodates a detent member 12 in the form of a ball which can protrude into the bore 10 and into the bore 11 (see particularly FIG. 3). The recess 30 for the ball is open towards the bores 10, 11 although, at the junction of the bores, it is sufficiently narrow to prevent the ball from fully entering the two bores. By way of example, the recess may be in the form of a chamfered partially blind bore which passes only partially through the walls of the bores 10 and 11. The recess is disposed at rightangles to the two bores 10, 11 and is offset downwardly relative to the transverse bore 11 (FIG. 3). The ball is displaceably guided in the recess and is prevented from dropping out of the recess by means of peened-over portions 31.

A locking sleeve 13 is displaceably guided on the holder head 8 and has an internal collar 14 which cooperates with a shoulder between the shank of the holder head 8 and the enlarged end 9. A compression spring 15 is arranged between the collar 14 and the end face of the rod 5' of the blade-holder 5.

The blade 16 has a cylindrical shank 17 incorporating a continuous recess 18 which, advantageously, is rounded. The shank 17 can be inserted into the longitudinal bore 10 (FIG. 2) or into the transverse bore 11 (FIGS. 1 and 3). When the shank is in the position illustrated in FIG. 2, the deburring tool serves preferably to deburr surfaces or edges accessible from the outside, whereas, in the arrangement illustrated in FIG. 1, it is possible to deburr edges which are accessible only from the inside, such as the edge 32 of a bore 33 in the interior of a tube 34.

When in its working positions, the blade is fixed in the axial direction by the spherical locking member 12 which engages into the recess 18 and which is fixed by the sleeve 13 so that it cannot yield, although the blade is rotatable about the axis of its shank 17. When the blade is to be removed or inserted, the sleeve 13 is pushed back against the force of the spring 15 until the ball emerges from the recess 18 and is displaced outwardly in the recess 30, whereby the blade is unlocked for withdrawal or the bore is free to receive a blade. It is to be noted that the locking device for the blade is effective with only one spherical locking member for the two bores 10, 11.

Figure 4:
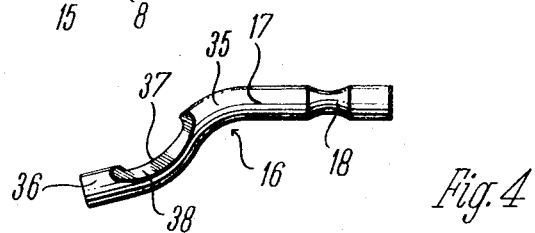
FIG. 4 is a view of the blade, drawn to a larger scale.

The blade illustrated in FIGS. 1, 2 and 4 has a bent portion 35 contiguous to the shank 17 and, contiguous to the bent portion 35, a portion 36 lying eccentrically of the axis of the shank, so that the basic shape of the blade is that of a crank whose material has a substantially circular cross-section. The cutting or scraping edge 37 is provided in the region of transition of the bent portion 35 into the portion 36 and is directed towards the axis of the shank. The scraping edge 37 is defined by arcuate surfaces 38 which have been ground from the material of the blade. The scraping edge is slightly recessed relative to the portion 36, so that it acts only upon the burr or the edge and not upon the inner surface of the bore whose mouth is to be deburred.

Figure 5:
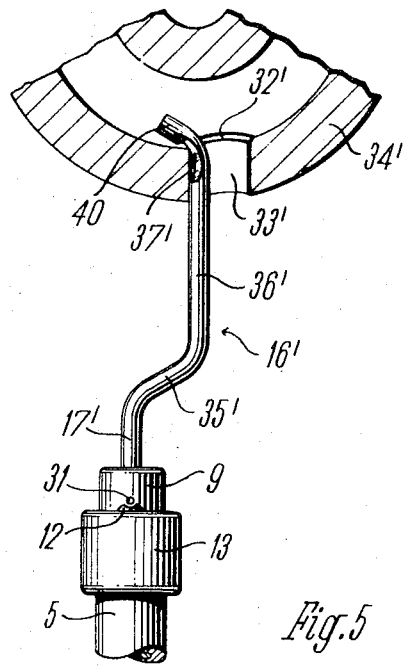
FIG. 5 is a fragmentary view of the deburring tool having a different blade, and a detail section through a finished workpiece.

FIG. 5 shows a blade 16' which may also be used to finish internal edges which are not readily accessible owing to the spatial conditions, for example, the internal edge 32' of a bore 33' in the elbow 34' of a tube.

The blade 16' has a bent portion 35' contiguous to the shank 17' and a portion 36' which is substantially parallel to, although eccentric of, the axis of the shank. A second bent portion 40, directed towards the axis of the shank, is contiguous to the portion 36'. The cutting or scraping edge 37' is substantially identical to that illustrated in FIG. 4 and is disposed in the transition between the bent portion 40 and the portion 36'.

For the purpose of effecting the deburring operation, the portion 36, 36' of the blade (compare FIG. 1 and FIG. 5) is inserted into the bore 33, 35' and the tool is rotated manually. The blade thus acts like a crank, so that the scraping edge is scraped along the edge 32, 32' and removes the burr. The scraping edge adjusts itself automatically to the correct scraping angle.

I claim:

1. A deburring tool comprising in combination: a handle; a blade-holder having a longitudinal bore and a transverse bore intersecting the longitudinal bore; means attaching said blade-holder to said handle; a scraper blade comprising a circular shank selectively insertable in and rotatable in either of said longitudinal and transverse bores, a crank-like bent portion contiguous to said shank, a portion located eccentrically of the axis of said shank and a scraping edge facing towards the axis of said shank; and releasable locking means disposed in the region of said longitudinal and transverse bores for rotatably holding said blade shank in the selected bore.

2. A tool according to claim 1, in which said handle has a longitudinal bore therein, and said blade-holder has a rod thereon axially displaceably guided in said handle bore, and in which means are included for fixing said rod of said blade holder in a selected one of various positions in said handle bore.

3. A tool according to claim 2, in which said rod of said blade-holder has a plurality of notches arranged therealong, and in which said fixing means include a detent member located in said handle and selectively engageable in said notches, a locking member displaceable on said handle and having a locking surface thereon cooperable with said detent member and a spring acting on said locking member to bias said locking member into a position in which said locking surface retains said detent member in a locking position in which the detent member is engaged in a selected one of said notches.

4. A tool according to claim 3, in which said rod of said blade-holder has a longitudinal groove therein and said notches are disposed along said groove, and in which said detent member is engaged in said longitudinal groove to prevent rotation of said blade-holder in said handle, even when said locking member is displaced against the bias of said spring.

5. A tool according to claim 2, in which said rod of said blade-holder has a longitudinal bore therein, and said blade-holder includes a holder head fitted into said longitudinal bore, said longitudinal and transverse bores being disposed in said holder head.

6. A tool according to claim 1, in which said blade shank has a continuous peripheral recess therein, and in which said blade locking means comprise a recess in said blade-holder, said recess being open to said longitudinal and transverse bores, a spherical detent member in said recess, a blade locking member displaceable on said blade-holder and a spring biasing said blade locking member into a position in which the latter engages said spherical detent member and holds said spherical detent member in a position in which it protrudes into said longitudinal and transverse bores and into said peripheral recess of said blade shank.

7. A tool according to claim 1, in which said scraping edge is disposed at a transition between said bent portion and said eccentrically located portion.

8. A tool according to claim 1, in which said blade includes a second bent portion contiguous to said eccentrically disposed portion, and in which said scraping edge is disposed in the region of said second bent portion.

9. A tool according to claim 1, in which said scraping edge is set back relative to portions of said blade adjacent said scraping edge.

* * * * *